SELECTABLE SPEED DRIVE FOR SOUND TRANSCRIPTION MECHANISMS

Filed June 24, 1950

2 SHEETS--SHEET 1

INVENTOR.
Sydney Simonson
BY
Kenyon & Kenyon
ATTORNEYS.

SELECTABLE SPEED DRIVE FOR SOUND TRANSCRIPTION MECHANISMS

Filed June 24, 1950 2 SHEETS—SHEET 2

INVENTOR.
Sydney Simonson
BY Kenyon & Kenyon
ATTORNEYS.

Patented Jan. 29, 1952

2,583,972

UNITED STATES PATENT OFFICE 2,583,972

SELECTABLE SPEED DRIVE FOR SOUND TRANSCRIPTION MECHANISMS

Sydney Simonson, Laurelton, N. Y., assignor, by mesne assignments, to Rek-O-Kut Company, Long Island City, N. Y., a partnership Application June 24, 1950, Serial No. 170,193

28 Claims. (Cl. 74—191)

While applicable to many related purposes, this invention finds particular application in the art of sound transcription by recording on or reproduction from sound signal storing records whether by current commercial methods, such as electro-mechanical methods (common phonograph disk records), magnetic methods (common tape or wire records), light-actuated methods (motion picture film), or any other method. It has for a general object the provision of structurally and operationally simple mechanisms capable of driving sound records used in any of these methods at selectable, highly constant speeds; and, as specific objects, the provision of such mechanisms meeting various demands for speed interchangeability, for example, where necessitated by the alternate use of the different speed (33⅓, 45 and 78 R. P. M.) phonograph records currently on the market, or where desired for the production of sound effects by sudden or gradual speed changes. Other objects will be apparent from the description hereinafter.

As is known, there is a need in this art for mechanisms by which one may adjust the speed of the record with respect to whatever mechanism (recording head) is employed for recording the sound signals on the record in response to the original sound, or whatever mechanism (pick-up head) is used for pick-up of the signal from the record for reproduction as sound. This is because the speed of the record in recording must be carefully repeated or matched in reproduction if faithful reproduction of the pitch or frequency of the original sound is to be had. The need is accentuated by variations in driving motor speed caused by variations in voltage and frequency of available common power sources, for example, differences in voltage and frequency of commercial power sources in different localities. Such motor speed variations necessitate corrective action to bring record speed to standard. In the case of common phonograph disk records, the need is further accentuated by the current commercial practice of employing three different record speeds requiring the user to change the speed of the machine depending upon the type of record he is using at the moment.

As is also known, it is essential to good recording and reproduction that the records move with constant speed with respect to the recording or pick-up head. A common difficulty in this respect arises from momentary variations, regularly or irregularly, of the speed from the set required speed necessary to faithful reproduction of the pitch or frequency of the sound involved. This phenomenon, often termed "wow," results in corresponding variations of the pitch of the reproduced sound which variations are not present in the original sound. The pitch variations distort the sound and are unpleasant to the hearer, especially in the case of music.

The present invention is believed to improve the art measurably with respect to the foregoing need and requirement, as well as others, as will be better understood by reference to the following specification and accompanying drawings. While the specification and drawings illustrate preferred embodiments of the invention in selectable speed drives for phonograph turntables which rotate common disk phonograph records, those skilled in the art will readily perceive how to adapt the invention to similar usage in connection with recording on and reproduction from tapes, wires, films, etc.

Figure 1:
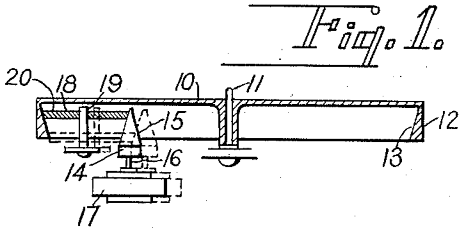
Fig. 1 illustrates schematically the underlying principle of the invention, embodied, for example, in an arrangement for rotating at a selectable yet highly constant speed some sort of a record carrying member 10, such as a phonograph turntable, or a drum for wires or tapes.
Figures 3, 4:
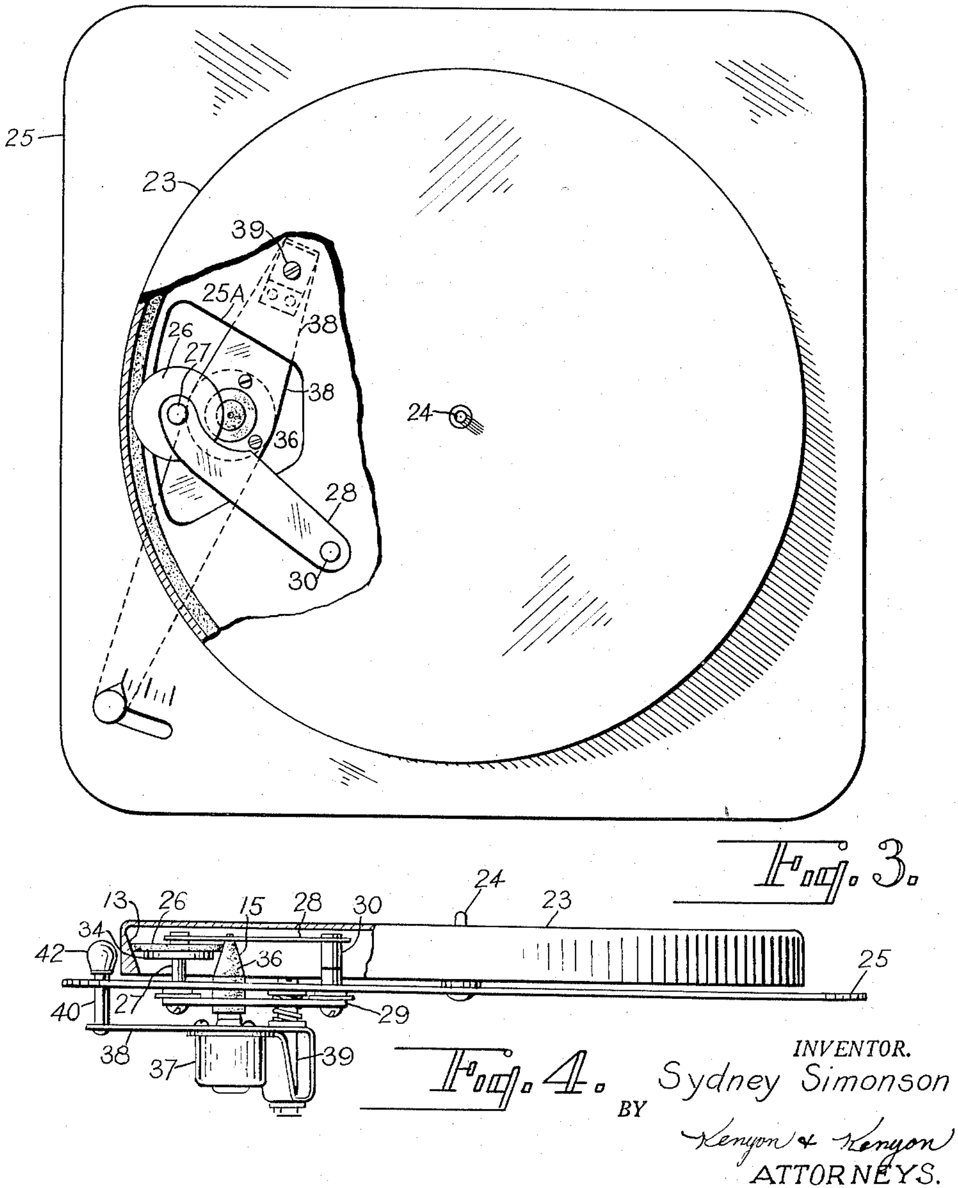
Figure 5:
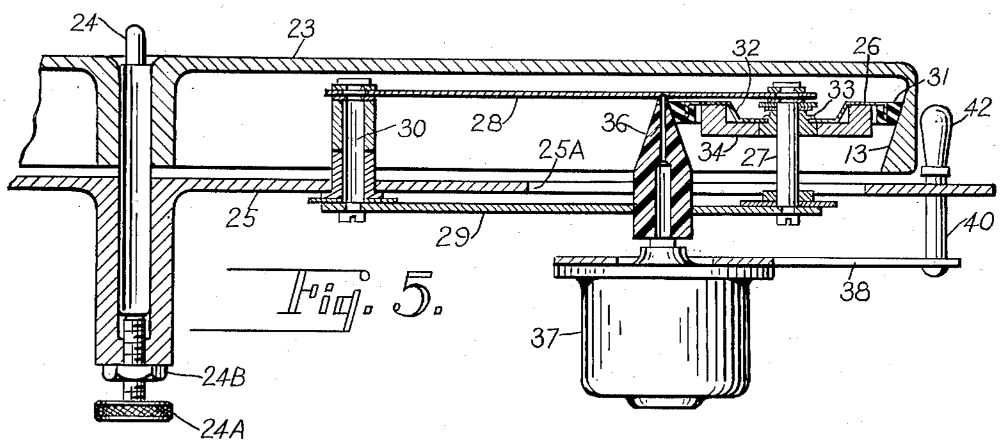
Figure 6:
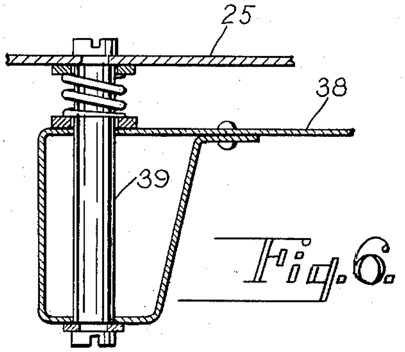
Figure 9:
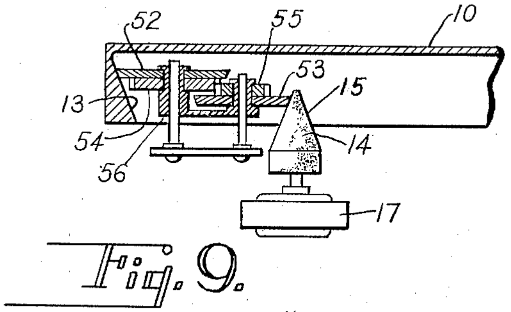
Figure 7:
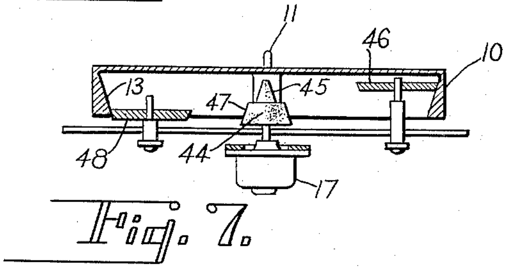
Figure 8:
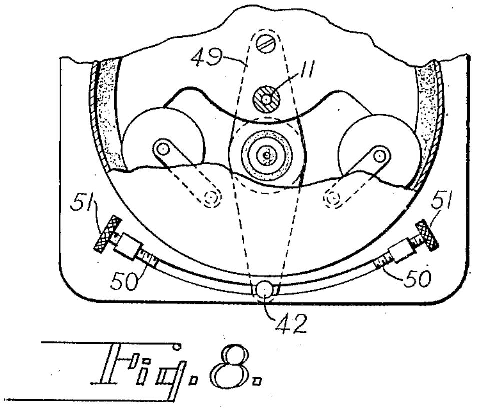

Figs. 3 and 4 illustrate in greater practical detail a preferred way of embodying the invention in phonograph turntable drive mechanisms, Fig. 3 being a fragmentary top elevation view of the mechanism with portions of the top surface of the turntable cut away in order to show the driving mechanisms underneath the same, Fig. 4 being a similar side elevation view as seen from that side shown lowermost in Fig. 3;

Figs. 5 and 6 show structural details which might be used in the Figs. 3 and 4 arrangement;

Figs. 7 and 8 illustrate an alternative embodiment of the invention in a turntable drive arranged for turntable rotation at two discrete speeds, such as 33⅓ and 45 R. P. M., and including means whereby these speeds may be adjusted within narrow limits;

Fig. 9 illustrates a modification of an essential portion of the Figs. 1 or 3 and 4 arranged to permit either greater reduction or greater step-up of the speed ratio between the driven member and the driving element.

Figure 10:
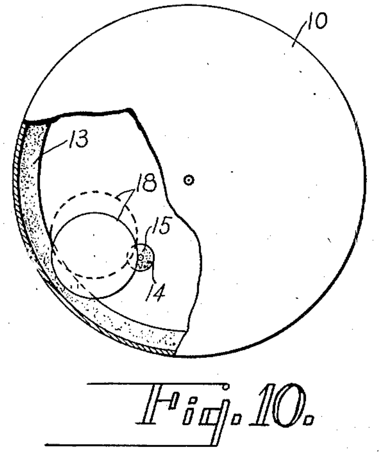

Fig. 10 illustrates schematically still another alternative arrangement to Fig. 1.

In view of the similarity of elements throughout the drawings, like numerals have been used to designate like parts throughout.

Referring now to the Fig. 1, and assuming for purposes of illustration that the arrangement shown there is applied to the driving of phonograph turntables of the kind adapted to rotate a conventional disk record in a horizontal plane at some selectable yet constant predetermined speed with respect to the recording or pick-up head (not shown), turntable 10 constituting the driven member is arranged freely to rotate horizontally about a vertical axis on spindle 11 and has a depending peripheral rim 12 inwardly sloped in the downward direction to define a conic frictional drive surface 13 having the shape of a zone on the inner surface of an inverted cone coaxial with the axis of spindle 11. A driving member 14 has a peripheral conic frictional drive surface 15 shaped as a zone on the outer surface of an upright cone coaxial with the vertical axis of its spindle 16 about which it is driven in horizontal rotation by suitable means such as motor 17. A gear-like idler 18 is mounted for free horizontal rotation about the vertical axis of movable shaft 19 and has a conic peripheral frictional drive surface 20 shaped as a zone on the outer surface of an inverted cone coaxial with the axis of shaft 19. Idler 18 is also freely mounted on shaft 19 such that, while always horizontal, it may slide down or up the length of shaft 19 under the force of gravity or lifting forces brought about when the driving member 14 is moved toward surface 13 on the driven member 10 thus "squeezing" and raising the idler as presently explained.

It will be noted that the conic surfaces 13 and 15 converge toward each other in the downward and diverge in the upward direction, the surface 20 of the idler converging on itself in the direction of convergence of surfaces 13 and 15. All three conic surfaces complement each other i. e., as the idler 18 is wedged by its weight between the converging conic surfaces of the driving and driven members, the angle of the idler surface with respect to vertical and the angle of the driving and driven surfaces with respect to horizontal add up to 90° and are such that uniform surface engagement occurs up and down the tangential lines of contact between the idler and the driving and driven members. For optimum "wow" free performance, the angles of the conic surfaces with respect to vertical should be identical for all three members and the idler should be engaged by the driving and driven members at diametrically opposite points on its periphery—this in order that the idler will be subject to equal and opposite forces at diametrically opposite points on its periphery. Thereby there will be no unbalanced force which might tend to cause wear of the idler bushing or bearing surface engaging the shaft or spindle about which it rotates. This is an important factor in the case of sound recording instruments because such wear will tend to enlarge the central bushing or bearing surface of the idler thereby permitting it to assume a non-horizontal tilt which will adversely affect the "wow" characteristics when employed for driving records.

It will be understood that by the use of the term "upright" and "inverted" with reference to cones is meant a cone which has its apex upward in the former and downward in the latter case.

In operation, it is assumed that the driving and driven members 14 and 10 are mounted suitably for relative motion toward and away from each other, preferably along a line approximating a radius of the driven member 10 in order that the idler conic surface will be engaged tangentially on diametrically opposite points of its periphery between the driven and driving members. Any suitable means for moving the driving and driven members in this fashion may be employed. It will be apparent that if the driving member 14 assumes the position shown in the full lines in Fig. 1 the idler 18 must necessarily assume a relatively upward position on its shaft 19 as indicated by the full lines. In other words, as the driving member moves inwardly, forces are established which "squeeze" the idler between surfaces 13 and 15 and push it upward. As will be apparent to those skilled in the art, in this upward position, there will be a comparatively large turn ratio between the driven and driving members because the driving member, by virtue of the conic surface 15 is operating on a relatively short radius from its axis while the driven member, by virtue of the conic surface 13, is being driven on a relatively long radius from its axis. This is as compared with the condition now to be indicated. If it be assumed that the driving member 14 is moved farther away from the conic surface 13 on the driven member, for example, to the position shown in the dotted lines, then the idler 18 will fall by its own weight on the shaft 19 to the position shown on the dotted lines. In that case, a somewhat smaller turn ratio will exist as between the driving and driven members because the driving member, by virtue of surface 15, now operates on a somewhat greater radius with respect to its axis of rotation while the driven member, by virtue of surface 13, operates on a somewhat smaller radius with respect to its axis. It will be readily apparent, therefore, that a continuous range of different driving ratios as between driving and driven members may be obtained depending upon the position assumed by the driving member between the dotted and full line positions. If the idler 18 is allowed to fall or be raised to an intermediate position, the turn ratio will of course be intermediate the extreme ratios of the full and dotted line positions. Shaft 19 is suitably mounted to accommodate shift of the axis of rotation of idler 18 as the drive ratio is changed in this manner.

It will be observed that the idler is biased by gravity always to engage the converging sides of the driving and driven members. Where smooth friction drive surfaces are employed, amount of torque or power which may be transmitted will of course be limited by the weight of the idler, the greater the weight the greater the amount of torque or power which may be transmitted. The use of a gravity bias in this manner is considered to be a substantial improvement in and of itself since it is found that a gravity bias of this character will tend to give a greater constancy of speed and consequently less "wow." While with some applications, spring bias means may be used, those are less desirable because of "breathing" characteristics of spring arrangement, i. e., variations in the tension of the spring which would tend to create a certain amount of speed variation and consequently "wow."

Figure 2:
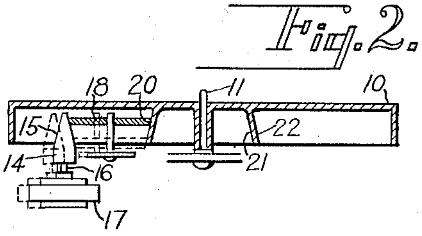
Fig. 2 illustrates an alternative arrangement to Fig. 1.

It will be understood of course that other arrangements for the conic surface on the driven member 10 may be employed. One such is illustrated in the Fig. 2 wherein the conic surface on the driven member is on the hub 21 having on its outer peripheral surface a conic frictional drive surface 22 having the shape of the outer surface of an upright cone or at least a zone thereof. Again, the axis of the cone is coaxial with that of the driven member 10. Otherwise, the relationships of the driving member and the idler are the same.

Referring now to the Figs. 3 and 4 illustrating a practical vibration-free arrangement implementing the principles of the Fig. 1, the turntable 23 is shown as mounted by suitable means for horizontal rotation on the vertical spindle 24 the upper end of which is adapted to receive common disk records. The turntable may be fashioned of any suitable material such as aluminum. The spindle may be affixed to any suitable fixed base member 25 forming the support common in mechanisms of this character and having a suitable opening 25A to accommodate certain of the parts projecting through it. The idler 26 is positioned by means of its vertical axle or shaft 27 supported for movement toward or away from turntable 23 on the radius arms 28 and 29 which may freely rotate about a center of rotation on a hub or journal 30 affixed to the base 25 by suitable means. As better shown by the Fig. 3 these radius arms and the hub have a center of rotation off the center of rotation of the turntable, such that the radius arms 28 and 29 will not interfere with the motion of the driving member presently to be indicated. The idler 26 may be constructed any suitable way and is better shown in Fig. 5 as constituting an annulus 31 of rubber or other suitable material mounted on the periphery of a spider 32 affixed to the hub 33 which may slide freely up and down shaft 27. For purposes of weighting the idler to give it the necessary weight to establish the desired torques in the driving system, an annular weight 34 may be affixed to the hub 33.

The conic driving member in this case takes the form of a linen or canvas base platsic frusto-conical member 36 although any suitable material which will produce the necessary friction may be employed. The member 36 is mounted on the shaft of a motor 37 which is pivotally mounted on a radius arm 38 journaled on shaft 39 affixed to the base 25 as better seen in the Figs. 4 and 6.

The outward end of the radius arm 38 may be provided with an upward extension 40 extending to a position above the base member 25 by projecting through an arc-like slot 41. It will be seen that the shaft 39, motor 37 and the member 36 are positioned approximately such that rotation of the radius arm 38 about its journal will move the driving member 36 approximately along a radius extending from the axis of rotation of the turntable 10 through the center of the driving member 36, through the center of the idler 26 and to the periphery of the turntable. As the radius arm 38 is rotated, therefore, the driving member 36 will be pushed tangentially up against the idler which in turn will transmit a force diametrically across the idler to the point of tangential engagement of the idler with the surface 13 on the turntable. The geometry of the centers of rotation of arms 28, 29 and 38, and of the other member of the system may be such as to insure this sort of diametric tangential engagement at all times.

As already indicated, as the motor and driving member 36 are moved outwardly along the radius of the turntable by clockwise rotation of arm 38 (as seen in Fig. 3), the driving member will tend to "squeeze" the idler between it and the turntable driving surface such that the idler will raise itself on its shaft 27. Conversely, as the radius arm is rotated toward the axis of the turntable, (counterclockwise in Fig. 3) the idler will drop thus continuously changing the ratios as previously indicated. Necessary movement of shaft 27 to accommodate shift of the idler axis is provided by rotation of arms 28 and 29.

The end of the extension 40 may be provided with a suitable operating knob 42 just above the level of the base 25 by which the positioning of the motor and driving member may be accomplished. Adjacent the knob 42 there may be provided a calibrated scale 43 indicating the speed at which the turntable is rotating in the various positions of the knob and consequently of the motor and driving member.

As an indication of typical dimensions found to work satisfactorily in practice, it has been found that an idler having a weight of somewhere from eight to twelve ounces is satisfactory for driving the average turntable. The angle of the various conic surfaces with respect to vertical may be, for example, anywhere between 18° to 21°. It will be understood of course that the angle will determine the rate at which the speed changes as the driving member 36 is advanced or withdrawn from the periphery of the turntable. If the angle of conic surfaces with respect to vertical is relatively small, the rate of change of speed will be small; conversely if the angle is large with respect to vertical the rate of change with relation to the movement of the member 36 will be large.

In the Figs. 7 and 8 there is illustrated schematically a modification by which two discrete yet slightly adjustable speeds may be obtained. In this case, the driving member takes the form of a two-step conic member 44. The upper step 45 is employed for driving an idler 46, similar to those already discussed, while the lower step 47 is employed for driving a similar second idler 48, both idlers being mounted similar to that in Figs. 3 and 4. The member 44 may be mounted somewhat like the member 36 in the Figs. 3 and 4 so that motion of a radius arm 49 will bring it into contact either with the idler 46 or the idler 48. In one case, the turntable might be arranged to rotate at 33 R. P. M. and in the other case 45 R. P. M. In order to permit small adjustment of the speed in the two cases, the arm 49 may be arranged to stop at stop members 50 which in turn may be provided with adjustment screws 51 permitting a fine adjustment of the stop positions.

If it should be desired to provide speed reductions or speed increases, greater than can be conveniently accomplished with the foregoing arrangements, the set-up schematically indicated in the Fig. 9 may be employed. In this case, two idlers 52 and 53 are provided and mounted similarly to the Figs. 1 or 3 and 4. These idlers each have similar conic surfaces, the conic surface of the idler 52 engaging the conic surface of the turntable, and the conic surface on the idler 53 engaging the conic surface on the driving member. These two idlers may be meshed in gear fashion by means of the intermediate frictional or gear drive members 54 and 55. It will be understood that the turn ratio as between these two members may be chosen to provide any desired reduction or raising of the speed ratios. The idlers 52 and 53 may be mounted on their respective spindles such that they raise and lower together. Any suitable means 56 for locking the two together so that they rise or fall together may be employed.

In Fig. 5 there has been illustrated another means for making small adjustments of turn ratio; for example, in order to permit slight factory adjustments correcting for speed variations caused by dimensional variations of the various parts within their manufacturing tolerances. This may comprise any suitable means for adjusting the relative vertical positions of the driving and driven members, for example, the vertical adjustment screw 24A threaded into the bottom of cup-shaped extension 25A of base member 25 and provided with lock nut 24B. If turntable 23 be affixed to spindle 24, it may be vertically adjusted and fixed by screw 24A and lock nut 24B at a suitable level, thereby adjusting the radii at which conic surfaces of the driving and driven members engage the idler. Alternatively, a similar arrangement may be provided for member 36.

As an alternative to the preceding arrangements, the driving member 14 may remain fixed while the idler 18 is moved at right angles to its axis to accomplish the function performed by the previously described motion of the driving member 14 in the preceding arrangements. This is illustrated schematically in Fig. 10 wherein the rotation axes of turntable 10 and driving member 15 are fixed while the axis of idler 18 is so mounted that the idler may also move in a horizontal direction, for example, between the dotted and full line positions. In so moving the idler may rise and fall on its axis to assume different turn ratio positions between the driving and driven members previously described (idler raised in full line position, lowered in dotted line position). Any suitable means for mounting the idler axis for either linear or arcuate motion may be used, for example, a radius arm like the arm 38 used for the motor 37 in Figs. 3 to 6.

It is understood that numerous modifications of the foregoing embodiments will occur to those skilled in the art without departing from the true spirit and scope of the invention.

What is claimed is:

1. In combination in a selectable speed drive system, a first rotary member having thereon means defining a first conic drive surface, a second rotary member having thereon a second conic drive surface, said surfaces diverging from each other in one direction and converging in the other, an idler intermediate said members for transmitting drive torque therebetween having a conic idler drive surface adapted to engage said first and second conic surfaces and converging in the direction of convergence of said first and second conic surfaces, means mounting said idler for motion into and out of the convergence of said first and second conic surfaces, means biasing said idler in the direction of convergence, and means for moving the relative positions of the axes of rotation of said rotary members and idler to compress and decompress said idler between said rotary members whereby to move said idler against and with the biasing force of said biasing means to vary the drive ratio between said members depending upon the position of said idler in the direction of said convergence.

2. A combination as in claim 1 in which said last mentioned means comprises means for moving said rotary members toward and away from each other whereby the position of said idler depends upon the spacing between said members.

3. A combination as in claim 1 in which the axes of rotation of said members are relatively fixed and said last mentioned means comprises means for moving said idler axis toward and away from the line between the axes of said members whereby the position of said idler depends upon the spacing between said idler axis and said line.

4. In combination in a selectable speed drive system, a first rotary member having thereon means defining a first conic drive surface, a second rotary member having thereon a second conic drive surface, said surfaces diverging from each other in one direction and converging in the other, an idler intermediate said members for transmitting drive torque therebetween having a conic idler drive surface adapted to engage said first and second conic surfaces and converging in the direction of convergence of said first and second conic surface, said members and idler being arranged to rotate about parallel axes and said conic surfaces being coaxial with the respective axes, means mounting said idler for motion along its axis into and out of the convergence of said first and second conic surfaces, means biasing said idler in the direction of convergence, and means for moving the relative positions of the axes of rotation of said rotary members and idler to compress and decompress said idler between said rotary members whereby to move said idler against and with the biasing force of said biasing means to vary the drive ratio between said members depending upon the position of said idler in the direction of said convergence.

5. A combination as in claim 4 in which said last mentioned means comprises means for moving said rotary members toward and away from each other whereby the position of said idler depends upon the spacing between said members.

6. A combination as in claim 4 in which the axes of rotation of said members are relatively fixed and said last mentioned means comprises means for moving said idler axis toward and away from the line between the axes of said members whereby the position of said idler depends upon the spacing between said idler axis and said line.

7. In combination in a selectable speed drive system, a first rotary member having thereon means defining a first conic drive surface, a second rotary member having thereon a second conic drive surface, said surfaces diverging from each other in the upward direction and converging in the downward, an idler intermediate said members for transmitting drive torque therebetween having a conic idler drive surface adapted to engage said first and second conic surfaces and converging in the downward direction, said members and idler being arranged to rotate about vertical axes and said conic surfaces being coaxial with the respective axes, means mounting said idler for vertical motion into and out of the convergence of said first and second conic surfaces, said idler being biased by its weight in the direction of convergence, and means for moving the relative positions of the axes of rotation of said rotary members and idler to compress and decompress said idler between said rotary members whereby to move said idler against and with its weight to vary the drive ratio between said members depending upon the vertical position of said idler.

8. A combination as in claim 7 in which said last mentioned means comprises means for moving said rotary members toward and away from each other whereby the position of said idler depends upon the spacing between said members.

9. A combination as in claim 7 in which the axes of rotation of said members are relatively fixed and said last mentioned means comprises means for moving said idler axis toward and away from the line between the axes of said members whereby the position of said idler depends upon the spacing between said idler axis and said line.

10. In combination in a selectable speed drive system, a first rotary member having thereon means defining a first conic drive surface, a second rotary member having thereon a second conic drive surface, said surfaces diverging from each other in the upward direction and converging in the downward, an idler intermediate said members for transmitting drive torque therebetween having a conic idler drive surface adapted tangentially to engage at diametrically opposite points of said idler drive surface said first and second conic surfaces and converging in the downward direction, said members and idler being arranged to rotate about vertical axes and said conic surfaces being coaxial with and at the same angle to the respective axes, means mounting said idler for vertical motion into and out of the convergence of said first and second conic surfaces, said idler being biased by its weight in the direction of convergence, and means for moving the relative positions of the axes of rotation of said rotary members and idler to compress and decompress said idler between said rotary members whereby to move said idler against and with its weight to vary the drive ratio between said members depending upon the vertical position of said idler.

11. A combination as in claim 10 in which said last mentioned means comprises means for moving said rotary members toward and away from each other whereby the position of said idler depends upon the spacing between said members.

12. A combination as in claim 10 in which the axes of rotation of said members are relatively fixed and said last mentioned means comprises means for moving said idler axis toward and away from the line between the axes of said members whereby the position of said idler depends upon the spacing between said idler axis and said line.

13. In combination in a selectable speed drive system for sound transcription apparatus, a first rotary member mounted for rotation about a first axis for driving a record and having thereon means defining a first conic drive surface coaxial with said first axis, a second rotary member mounted for rotation about a second axis and having thereon means defining a second conic drive surface coaxial with said second axis, an idler member mounted for rotation about an idler axis and for movement along said idler axis, said idler being shaped to define a conic idler drive surface on the periphery thereof coaxial with said idler axis, all of said axes being parallel to each other, said first and second conic drive surfaces having their apices so directed that the surfaces diverge from each other in one direction and converge in the other and said conic idler surface having its apex in the direction of convergence of said first and second surfaces, and control means for bringing said second member and idler into driving relation to said first member through said surfaces with said idler intermediate said first and second members including means biasing said idler along its axis to engage its conic surface with said first and second conic surfaces and means for moving one of said axes back and forth to move said idler along its axis against and with the biasing force of said biasing means whereby to vary the driving ratio between said first and second members.

14. A system as in claim 13 in which said first rotary member has an annular rim extending axially thereof, the inner side of said rim defining said first conic drive surface.

15. A system as in claim 13 in which said first rotary member has a hub extending axially thereof, the outer side of said hub defining said first conic drive surface.

16. In combination in a selectable speed drive system for sound transcription apparatus, a first rotary member and vertical axle mounting the same for horizontal rotation about a first vertical axis for driving a record and having thereon means defining a first conic drive surface coaxial with said first axis, a second rotary member and vertical axle mounting the same for horizontal rotation about a second vertical axis and having thereon means defining a conic drive surface coaxial with said second axis, an idler member and vertical axle mounting the same for horizontal rotation about a vertical idler axis and for movement up and down said idler axle against and by its weight, said idler being shaped to define a conic idler drive surface on the periphery thereof coaxial with said idler axis, said first and second conic drive surfaces having their apices so directed that the surfaces diverge from each other in the upward direction and converge in the downward and said conic idler surface having its apex downwardly directed into the convergence of said first and second surfaces, and control means for bringing said second member and idler into driving relation to said first member through said surfaces with said idler intermediate said first and second members, said idler being biased by its weight to engage its conic surface with said first and second conic surfaces, said control means including means for moving one of said axles back and forth in a horizontal direction to establish forces to move said idler up and down its axle against and with its weight to vary the driving ratio between said first and second members.

17. A system as in claim 16 in which said first rotary member has a depending annular rim extending axially thereof, the inner side of said rim converging toward said first axis as an inverted cone to define said first conic drive surface, said second rotary member being within said rim and shaped as an upright cone to define said second conic drive surface on the outside thereof.

18. A system as in claim 16 in which said first rotary member has a depending hub extending axially thereof, the outer side of said hub converging toward said first axis as an upright cone to define said first conic drive surface, said second rotary member being adjacent said hub and shaped as an upright cone to define said second conic drive surface on the outside thereof.

19. A system as in claim 16 in which the angles of all said surfaces with respect to their axes are equal.

20. In combination in a selectable speed drive system for phonograph turntables, a driven rotary turntable member mounted for horizontal rotation about a first vertical axis for driving a record and having thereon means defining a first conic drive surface coaxial with said first axis, a driving rotary member mounted for horizontal rotation about a second vertical axis and having thereon means defining a second conic drive surface coaxial with said second axis, an idler member and axle mounting the same for horizontal rotation about a vertical idler axis and for movement up and down said idler axis against and by its weight, said idler being shaped to define a conic idler drive surface on the periphery thereof coaxial with said idler axis, the angles of all said surfaces with respect to vertical being equal, said first and second conic drive surfaces having their apices so directed that the surfaces diverge from each other in the upward direction and converge in the downward and said conic idler surface having its apex downwardly directed into the convergence of said first and second surfaces, and control means for bringing said driving member and idler into driving relation to said driven member through said surfaces with said idler intermediate said driving and driven members and tangentially engaging both at approximately diametrically opposite points of said idler drive surface, said idler being biased by its weight to engage its conic surface with said first and second conic surfaces, said control means including means for moving one of said axes back and forth in a horizontal direction to establish forces to move said idler up and down its axle against and with its weight to vary the driving ratio between said driving and driven members.

21. A system as in claim 20 in which said driven rotary member has a depending annular rim extending axially thereof, the inner side of said rim converging toward said first axis as an inverted cone to define said first conic drive surface, said second rotary member being within said rim and shaped as an upright cone to define said second conic drive surface on the outside thereof.

22. A system as in claim 20 in which said driven rotary member has a depending hub extending axially thereof, the outer side of said hub converging toward said first axis as an upright cone to define said first conic drive surface, said second rotary member being adjacent said hub and shaped as an upright cone to define said second conic drive surface on the outside thereof.

23. A combination as in claim 20 in which said last mentioned means comprises means for moving said rotary members toward and away from each other whereby the position of said idler depends upon the spacing between said members.

24. A combination as in claim 20 in which the axes of rotation of said members are relatively fixed and said last mentioned means comprises means for moving said idler axis toward and away from the line between the axes of said members whereby the position of said idler depends upon the spacing between said idler axis and said line.

25. In combination in a selectable speed drive system for sound transcription apparatus, a first rotary member mounted for rotation about a first axis for driving a record and having thereon means defining a first conic drive surface coaxial with said first axis, a second rotary member mounted for rotation about a second axis and having thereon means defining second and third conic drive surfaces coaxial with said second axis, first and second idler members mounted for rotation about first and second idler axes and for movement along said idler axes, said idlers being shaped to define first and second conic idler drive surfaces on the peripheries thereof coaxial with the respective idler axes, all of said axes being parallel to each other, the apices of said first and said second and third conic drive surfaces being so directed that the first surface diverges from the second and third surfaces in one direction and converges in the other and said conic idler surfaces having their apices in the direction of convergence of said first, second and third surfaces, and control means for bringing one of said second and third surfaces and one of said idlers selectively into driving relation to said first member through the respective surfaces with said one of said idlers intermediate said first and said one of said second and third surfaces including means biasing said idlers to engage their conic surfaces with said first and said one of said second and third conic surfaces and means for moving said second member toward and away from said first member whereby said one of said idlers may be moved by or against the biasing force of said biasing means to vary the driving ratio between said first and second members.

26. A system as in claim 25 in which said first rotary member has an annular rim extending axially thereof, the inner side of said rim converging toward said first axis as said rim extends, said second rotary member being within said rim and the conic surfaces thereon having their apex directed in the direction opposite to the extension of said rim.

27. In combination in a selectable speed drive system, a first rotary member having thereon means defining a first conic drive surface, a second rotary member having thereon means defining a second conic drive surface, said surfaces diverging from each other in one direction and converging in the other, an idler member intermediate said rotary members for transmitting a drive torque therebetween having a conic idler drive surface adapted to engage said first and second conic surfaces and converging in the direction of convergence of said first and second conic surfaces, means mounting said idler member for motion into and out of the convergence of said first and second conic surfaces, means biasing said idler in the direction of convergence to engage its conic surface with said first and second conic surfaces, and means for moving one of said members in back and forth motion relative to the other two to move said idler member with and against the biasing force of said biasing means in and opposite the direction of convergence of said first and second conic surfaces whereby to vary the drive ratio between said members depending upon the position of said idler member in the direction of said convergence.

28. In combination in a selectable speed drive system, a first rotary member having thereon means defining a first conic drive surface, a second rotary member having thereon means defining a second conic drive surface, said surfaces diverging from each other in upward direction and converging in the downward, an idler member intermediate said rotary members for transmitting a drive torque therebetween having a conic idler drive surface adapted to engage said first and second conic surfaces and converging in the downward direction, said members being arranged to rotate about vertical axes and said conic surfaces being coaxial with the respective axes, means mounting said idler member for motion along its axis into and out of the convergence of said first and second conic surfaces, said idler being biased by its weight in the direction of convergence to engage its conic surface with said first and second conic surfaces and means for moving one of said members in back and forth motion relative to the other two to move said idler member with and against its weight in and opposite the direction of convergence of said first and second conic surfaces whereby to vary the drive ratio between said members depending upon the position of said idler member in the direction of said convergence.

SYDNEY SIMONSON.

REFERENCES CITED

The following references are of record in the file of this patent:

UNITED STATES PATENTS

| Number | Name | Date |
|---|---|---|
| 1,775,201 | Jacobsen | Sept. 9, 1930 |
| 2,216,642 | Davis | Oct. 1, 1940 |
| 2,412,351 | Mount | Dec. 10, 1946 |

FOREIGN PATENTS

| Number | Country | Date |
|---|---|---|
| 257,792 | Great Britain | Sept. 9, 1926 |